(12) United States Patent
Sjöö et al.

(10) Patent No.: US 7,195,427 B2
(45) Date of Patent: Mar. 27, 2007

(54) CUTTING INSERT WITH AN ARRAY OF SURFACES RECEIVING CLAMPING FORCES

(75) Inventors: Sture Sjöö, Gävle (SE); Tomas Sjöberg, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/127,143

(22) Filed: May 12, 2005

(65) Prior Publication Data

US 2006/0018723 A1 Jan. 26, 2006

Related U.S. Application Data

(63) Continuation of application No. PCT/SE03/01749, filed on Nov. 12, 2003.

(30) Foreign Application Priority Data

Nov. 13, 2002  (SE) .................................. 0203378

(51) Int. Cl.
*B23B 29/08* (2006.01)
(52) U.S. Cl. .......................... 407/82; 407/111; 407/113
(58) Field of Classification Search .................. 407/81, 407/82, 90, 100, 102, 104, 107, 111, 113–116; *B23B 29/08*
See application file for complete search history.

(56) References Cited

U.S. PATENT DOCUMENTS

| | | | |
|---|---|---|---|
| 3,314,126 A | | 4/1967 | Stier |
| 4,477,212 A | * | 10/1984 | Kraft ........................... 407/104 |
| 4,480,950 A | | 11/1984 | Kraft et al. |
| 4,626,141 A | * | 12/1986 | Malaker et al. ............. 407/114 |
| 4,846,609 A | * | 7/1989 | Bernadic et al. ............ 407/114 |
| 5,033,916 A | | 7/1991 | Dunklau |
| 5,100,268 A | * | 3/1992 | Nakayama et al. ......... 407/104 |
| 5,122,017 A | * | 6/1992 | Niebauer .................... 407/114 |
| 5,192,171 A | * | 3/1993 | Ther et al. .................. 407/114 |
| 5,249,894 A | * | 10/1993 | Bernadic et al. ............ 407/114 |
| 5,324,144 A | * | 6/1994 | Katbi et al. ................. 407/114 |
| 5,599,141 A | * | 2/1997 | Katbi et al. ................. 407/114 |
| 5,658,100 A | * | 8/1997 | Deiss et al. ................... 407/35 |
| 5,915,889 A | * | 6/1999 | Kress et al. ................ 407/114 |
| 6,234,726 B1 | * | 5/2001 | Okada et al. ............... 407/114 |
| D445,810 S | * | 7/2001 | Alexander, IV ............ D15/139 |
| 6,379,087 B1 | * | 4/2002 | Alexander, IV ............. 407/107 |

(Continued)

FOREIGN PATENT DOCUMENTS

DE    197 03 848    7/1998

*Primary Examiner*—Monica Carter
*Assistant Examiner*—Sara Addisu
(74) *Attorney, Agent, or Firm*—Drinker Biddle & Reath LLP

(57) ABSTRACT

A cutting insert includes a body that forms top and bottom surfaces, and a center hole intersecting at least the top surface (e.g., a through-hole). A portion of the top surface which extends around the center hole includes an array of projections radiating laterally outwardly around the center hole. A distal end of each projection disposed farthest from the center hole defines a tip of the projection. The projections form at least six tips spaced circumferentially apart. Each tip has a planar top face. A clamp has flat contact surfaces which press downwardly against the planar top faces of respective projections simultaneously as the clamp pulls the insert against an upstanding support surface.

22 Claims, 4 Drawing Sheets

U.S. PATENT DOCUMENTS

| | | | |
|---|---|---|---|
| 6,394,709 B1 * | 5/2002 | Sjoo et al. ..................... 407/2 |
| 6,641,337 B1 | 11/2003 | Rothballer |
| 6,682,273 B2 * | 1/2004 | Sjoo et al. .................. 407/105 |
| 7,121,771 B2 * | 10/2006 | Englund ..................... 407/103 |
| 2002/0131830 A1 * | 9/2002 | Sjoo et al. .................. 407/105 |
| 2003/0086766 A1 * | 5/2003 | Andras ....................... 407/102 |

* cited by examiner

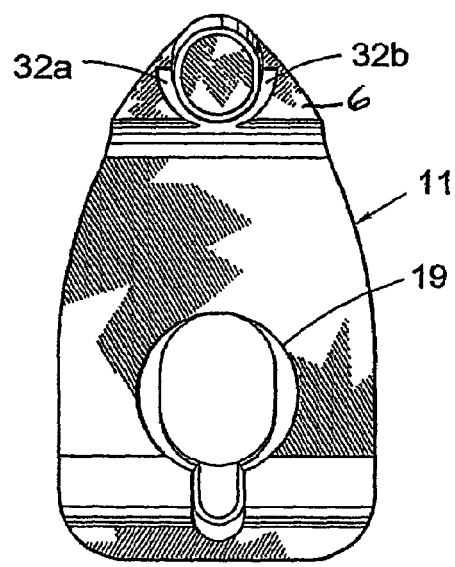
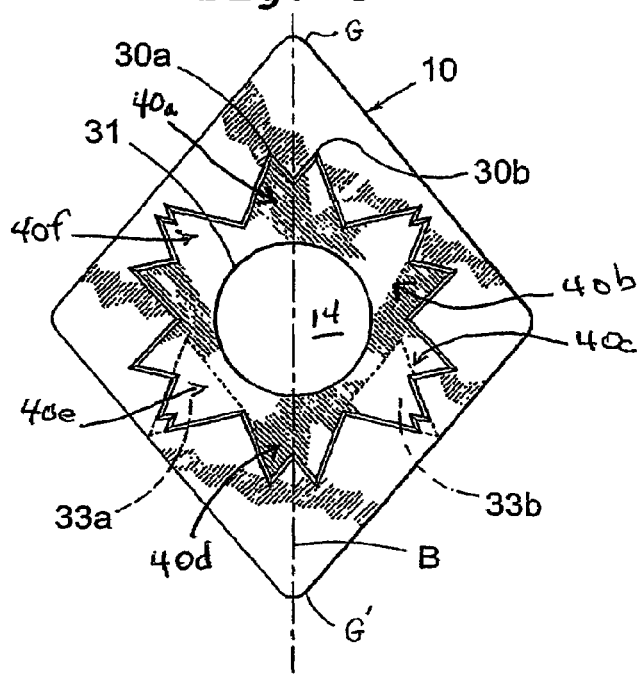
Fig. 3
Fig. 4
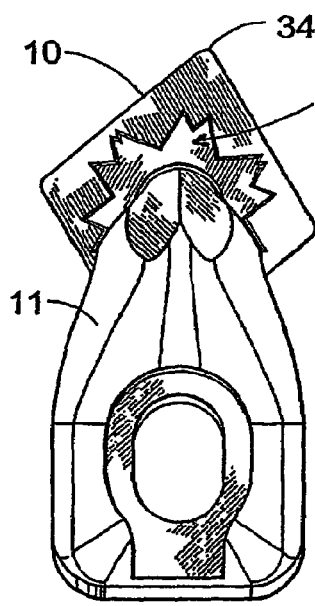
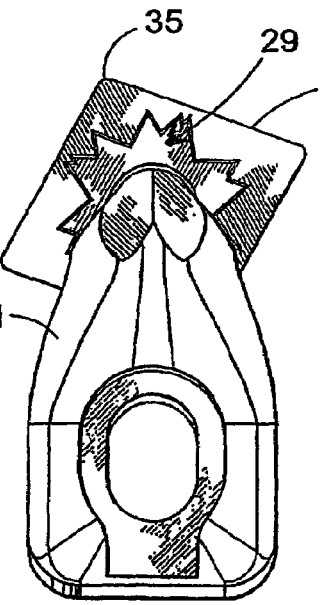
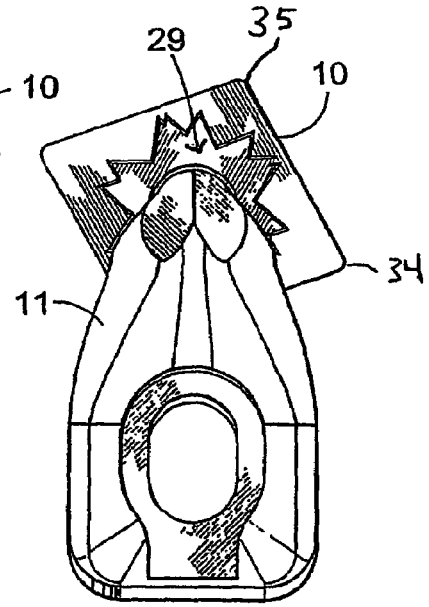
Fig. 5a
Fig. 5b
Fig. 5c

CUTTING INSERT WITH AN ARRAY OF SURFACES RECEIVING CLAMPING FORCES

This application is a Continuation of International Application Serial No. PCT/SE03/01749 filed on Nov. 12, 2003, and which published as WO 2004/058437 on Jul. 15, 2004.

BACKGROUND

The present invention relates to plate-like cutting inserts, intended for chip removing machining of metallic materials, the inserts having a central hole for receiving part of a clamp. Such indexable inserts normally have cutting tip angles below 80° and are usually intended for different types of copying. On the market, there is now a plurality of different types of insert holders, which are especially adapted for such indexable inserts, such as rhombic, rhomboid or isosceles triangular indexable inserts. The material used to make such indexable inserts is normally sintered cemented carbide or ceramics.

A frequently used type of indexable insert is provided with a so-called wiper geometry outside in each active cutting corner. The meaning of this is a radius-modified corner geometry, with the corner radius in the cutting corner being composed of a plurality of small radii adjacent each other, with each radius portion adjoining the next radius portion having another radius size. With this type of geometry, it has become possible to increase the feeding of the cutting insert significantly at the same time as a desired good surface finish of the machined workpiece can be attained. Upon the use of such cutting inserts having a wiper geometry, the cutting insert is not clamped by the usual lever holders, e.g., of the type shown and disclosed in U.S. Pat. No. 3,314,126. Upon use of a wiper insert, it is now desirable to employ a holder system, which upon clamping of the cutting insert, applies not only an inward-drawing force but simultaneously also a downward-pressing force. This represents in itself a certain limitation as for the choice of geometries for the upper chip side of the cutting insert.

OBJECTS AND SUMMARY OF THE INVENTION

Against this background, it is an object of the present invention to provide a new insert design, which on the one hand, is adapted for an efficient locking by means of the above-mentioned type of insert holder having inward-directed as well as downward-directed tensile forces, and which on the other hand leaves a sufficiently large margin on the top side of the cutting insert in order to, e.g., enable desired corner marking or other geometric marking or which enables insertion of more advanced chip breaker geometries directly pressed into the upper chip surface.

The present invention relates to a cutting insert which comprises a body that forms top and bottom surfaces, and a center hole intersecting at least the top surface (e.g., a through-hole). A portion of the top surface which extends around the center hole includes an array of projections radiating laterally outwardly around the center hole. A distal end of each projection disposed farthest from the center hole defines a tip of the projection. The projections form at least six tips spaced circumferentially apart. Each tip has a planar top face.

The invention also relates to a cutting tool employing such a cutting insert in combination with a holder and a screwed-in clamp.

BRIEF DESCRIPTION OF THE DRAWINGS

The invention will be described closer in detail in connection with preferred embodiments of the invention shown in the drawings:

FIG. 3 shows bottom view of a clamp shown in FIGS. 1–2, FIG. 4 shows a top plan view of an indexable insert according to FIGS. 1–2, FIGS. 5a–5c show the clamp and the indexable insert in three respective cutting positions.

DETAILED DESCRIPTION OF PREFERRED EMBODIMENTS

Figure 1:
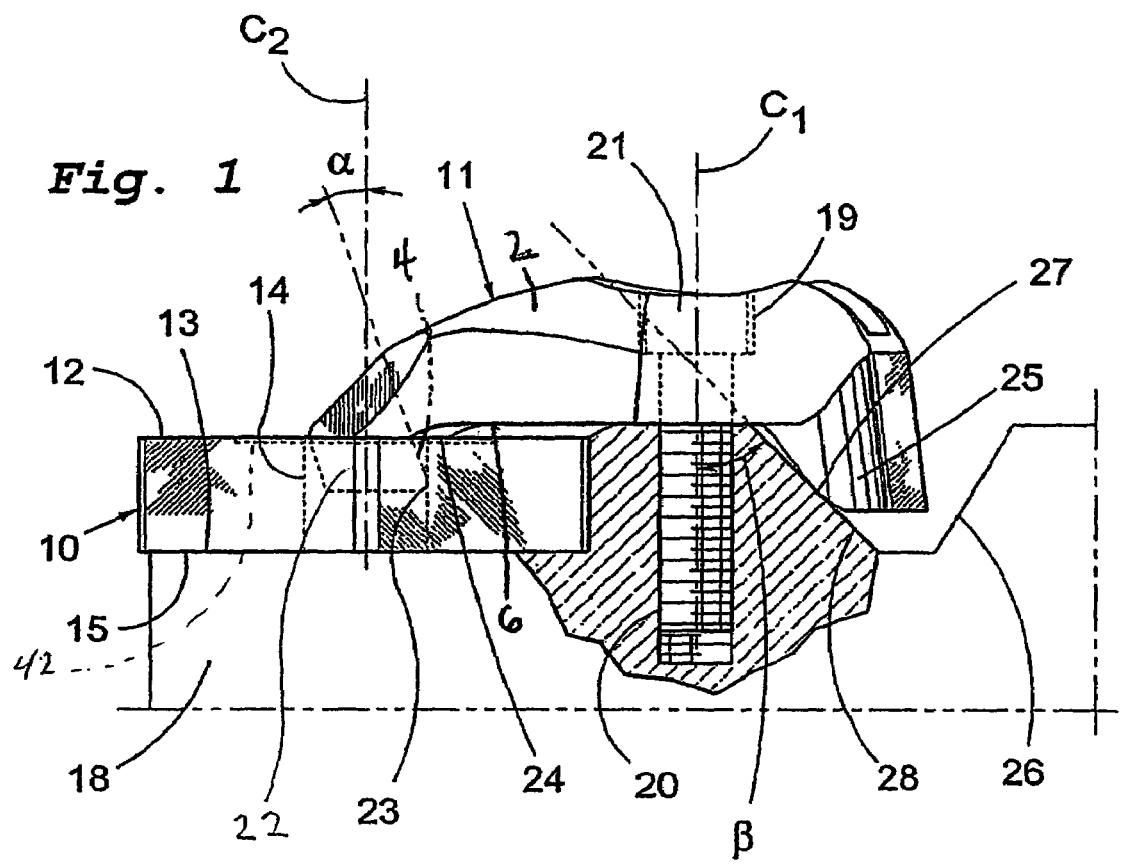
FIG. 1 shows a side view of an insert holder and an indexable cutting insert according to a first embodiment of the invention.
Figure 2:
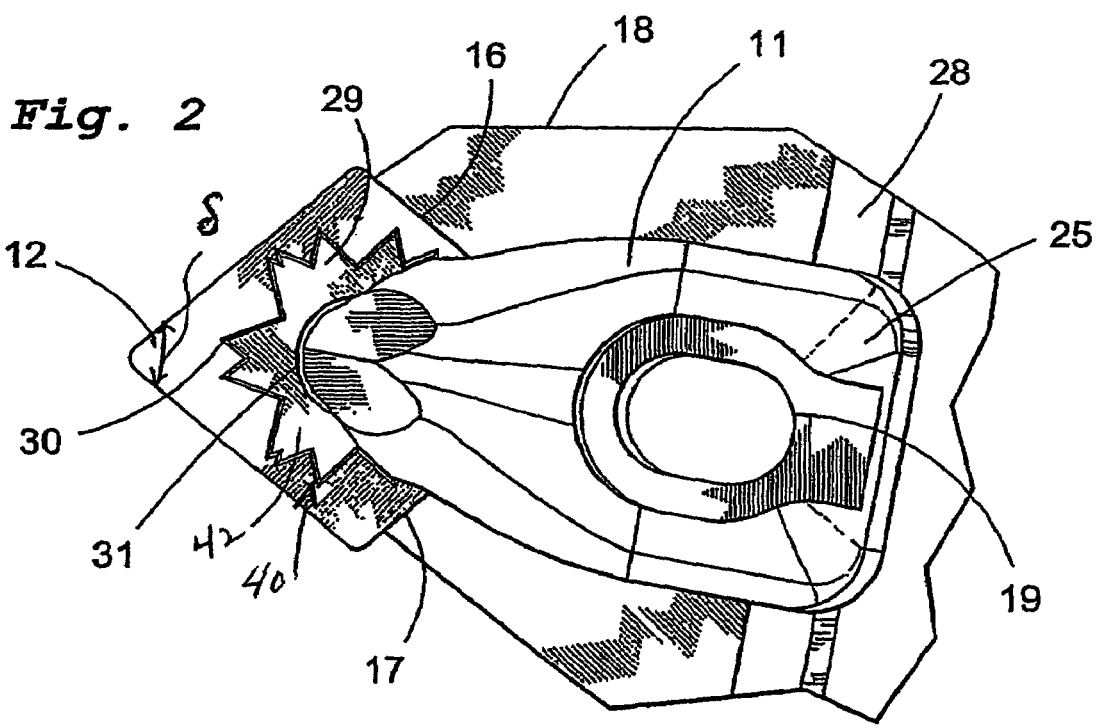
FIG. 2 shows a top plan view of an insert holder in cooperation with an indexable insert according to FIG. 1.

The indexable insert 10 shown in FIGS. 1–2 is shown in cooperation with a holder clamp 11. The indexable insert has, in this shown embodiment, a rhombic base shape and cutting tip angles δ below 80°. The planar top and bottom surfaces 12 and 13 of the indexable insert, which are mutually parallel, form a right angle to the edge surfaces uniting them. The indexable insert 11 has a central through hole 14, the center axis of which is oriented perpendicularly to the flat surfaces 12 and 13 of the cutting insert. The seating in which the indexable insert 10 is received comprises a bottom support surface 15 and two side support surfaces 16 and 17 upstanding perpendicularly from the surface 15. The bottom support surface 15 may be formed either by an insert holder 18, as in the shown embodiment, or by a separate conventional shim plate (not shown) mounted by means of a suitable fastening means (not shown).

So as to enable clamping of the indexable insert 10 in the seat of the insert holder, the clamp 11 is maneuverable by means of a tightening screw 21 extending through an elongate recess 19 of the clamp and threadedly connected in a threaded boring 20 in the holder 18. The center axis $C_1$ of the boring 20 is oriented parallel to the center axis $C_2$ of the insert hole 14. The clamp 11 includes an arm 2, the front end of which has a downwardly-inwardly directed projection 22 extending into the insert's center hole 14 and having a surface 4 facing the boring 20 and oriented at an oblique angle α in relation to the center axis $C_2$ of the hole 14. The projection 22 is arranged to be brought to engagement with a rear portion of the wall of the hole 14 i.e., a portion of that wall that is closest to the screw 21. The engagement occurs at a contact point 23 a distance down in the insert hole. Simultaneously, contact surfaces of the bottom side 6 of the clamp arm 2 engage the top surface 12 of the cutting insert at locations 24 near the rear side of the center hole 14.

The opposite rear end of the clamp arm 2 comprises a second projection 25 which is received in a recess 26 in the insert holder 18, the end surface 27 of the projection 25 being convexly formed and arranged to be brought into surface contact with a corresponding planar stop face 28 of the recess 26, which stop face is formed at an oblique angle to the center axis $C_1$ of the tightening screw. Alternatively, the end surface 27 may be flatly formed for surface contact with the planar stop face 28. The size of the oblique angle a should be substantially the same as, or somewhat less than, the acute angle of inclination β at which the rear contact surface 28 in the holder is oriented.

According to the invention, the portion of the upper surface of the cutting insert extending around the central hole 14 includes an array of projections which radiate laterally outwardly around the center hole and which can be raised or recessed with respect to the adjacent portions of the insert's top surface. For example, in FIGS. 1–5c there is an array 29. of projections 40 which radiate around the center hole 14 in a laterally outward direction, i.e., laterally relative to the axis $C_2$ of the center hole 14. Each projection has a planar (flat) top face 42 which is spaced from adjacent portions of the insert's top surface, e.g., the projections are recessed with respect to those adjacent surface portions, but they could instead be raised. The distal ends 30 of the projections, i.e., the ends of the projections spaced farthest from the center hole, could be in the form of one or more tips, which could be sharp, rounded or blunt.

Figure 4A:
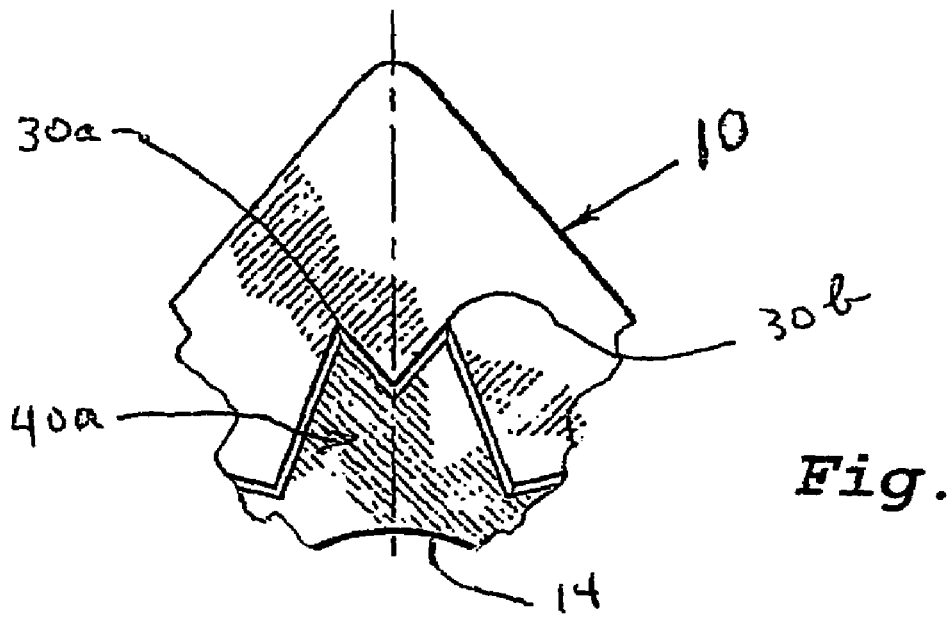
FIG. 4a is a fragmentary view of the insert showing one type of projection in an array of projections.
Figure 4B:
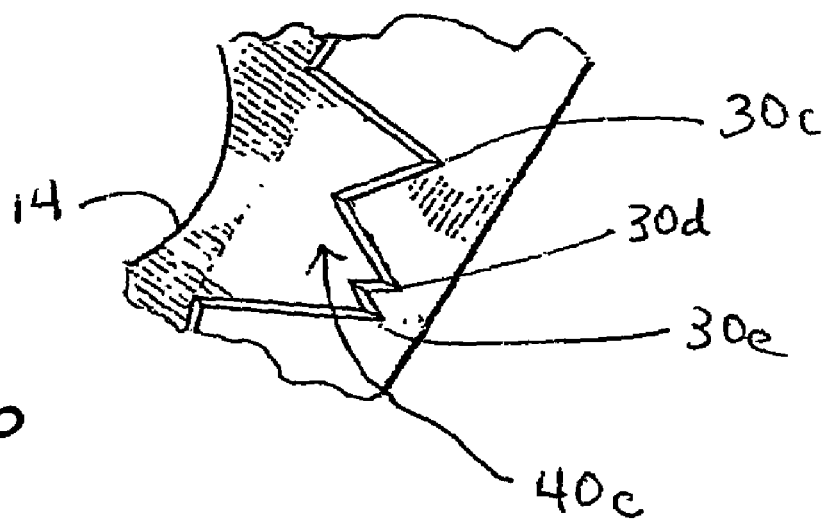
FIG. 4b is a fragmentary view of another part of the insert showing another projection in the array.

For example, in the embodiment shown in FIGS. 1–5c, there are six projections 40a–40f which are joined together to create a generally star-shaped projection array as viewed in FIG. 4. Each of the projections 40a and 40d has a distal end comprised of two sharp tips 30a, 30b (e.g., see FIG. 4a), whereas each of the remaining projections has a distal end comprised of three sharp tips 30c, 30d, 30e (e.g., see FIG. 4b).

In a polygonally shaped insert having a pair of oppositely disposed corners which are bisected by a common imaginary bisector that passes through the center of the center hole, the projection array is preferably configured symmetrically about that bisector.

For example, in the rhombic-shaped insert shown in FIGS. 1 through 5c, a bisector B bisects two opposing acutely-angled corners G, G' of the insert 10 and passes through the center of the hole 14. The projections 40a, 40d (each of whose distal end comprises two tips 30a, 30b) are arranged symmetrically with respect to the bisector B such that the tips 30a, 30b are symmetrically disposed on opposite sides of the bisector.

The substantially star-shaped array 29 is intended to be in surface contact (in contrast to point contact or line contact) with contact surfaces of the clamp arm 2 at locations situated near the central insert hole 14, namely a pair of spaced-apart flat (planar) contact surfaces 32a and 32b. A laterally inner edge of the array 29 coincides with the hole 14.

The contact surfaces 32a, 32b are shown as being arc-shaped, having a tapering width. Alternatively, other shapes are possible, such as triangular as shown at 33a and 33b in FIG. 4.

In FIGS. 5a, 5b and 5c is shown how the indexable insert 10 can enable exposure of the acute-angled cutting corner, designated 34 in FIG. 5a, as well as the obtuse-angled cutting corner, designated 35, for chip forming machining with one and the same type of clamp.

Figure 6:
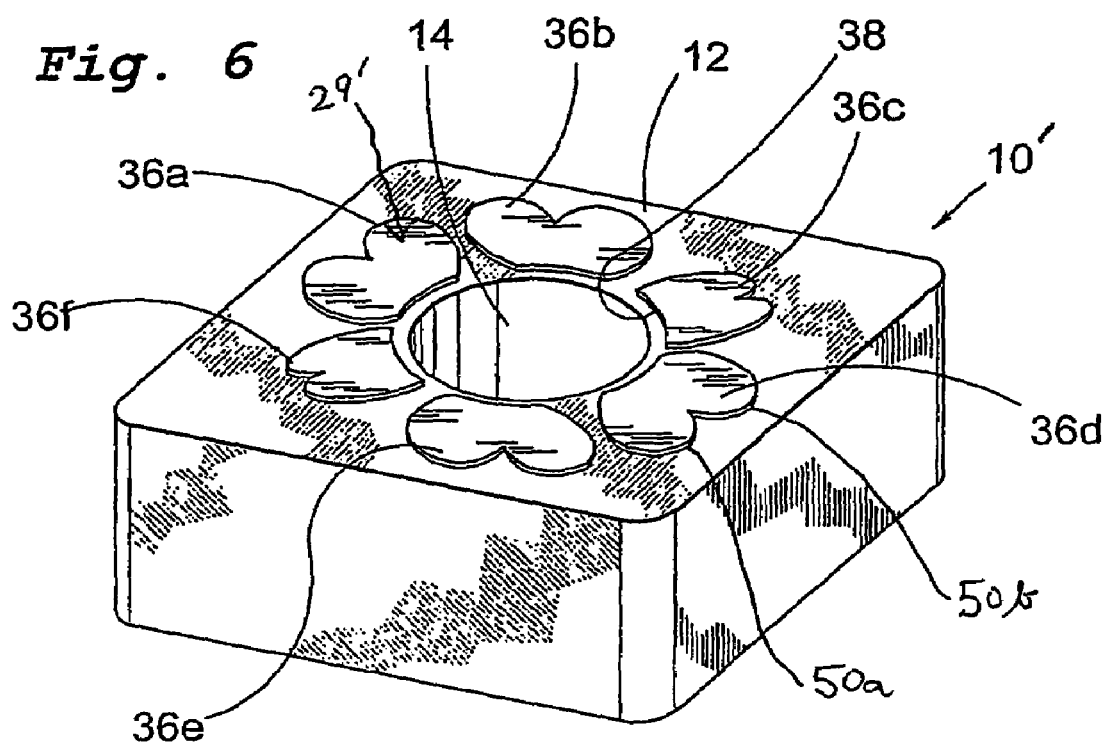
FIG. 6 shows a top perspective view of an alternative insert shape according to the invention.

In FIG. 6, an alternative insert 10' having a projection array 29' is shown, having six spaced-apart heart-shaped projections 36a, 36b, 36c, 36d, 36e and 36f radiating laterally outwardly around the center hole. The distal end of each projection comprises two convexly rounded tips 50a, 50b. Planar top faces of the projections are parallel with the surrounding flat surface portions 12 as well as being raised relative thereto, i.e., elevated a distance in relation to the surface portions 12. The laterally inner limiting edge 38 of each heart-shaped projection is concavely curved with radius substantially equal to the radius of curvature of the central hole 14. Each edge 38 is spaced laterally (radially) outwards by a small distance from the hole 14.

Figure 7:
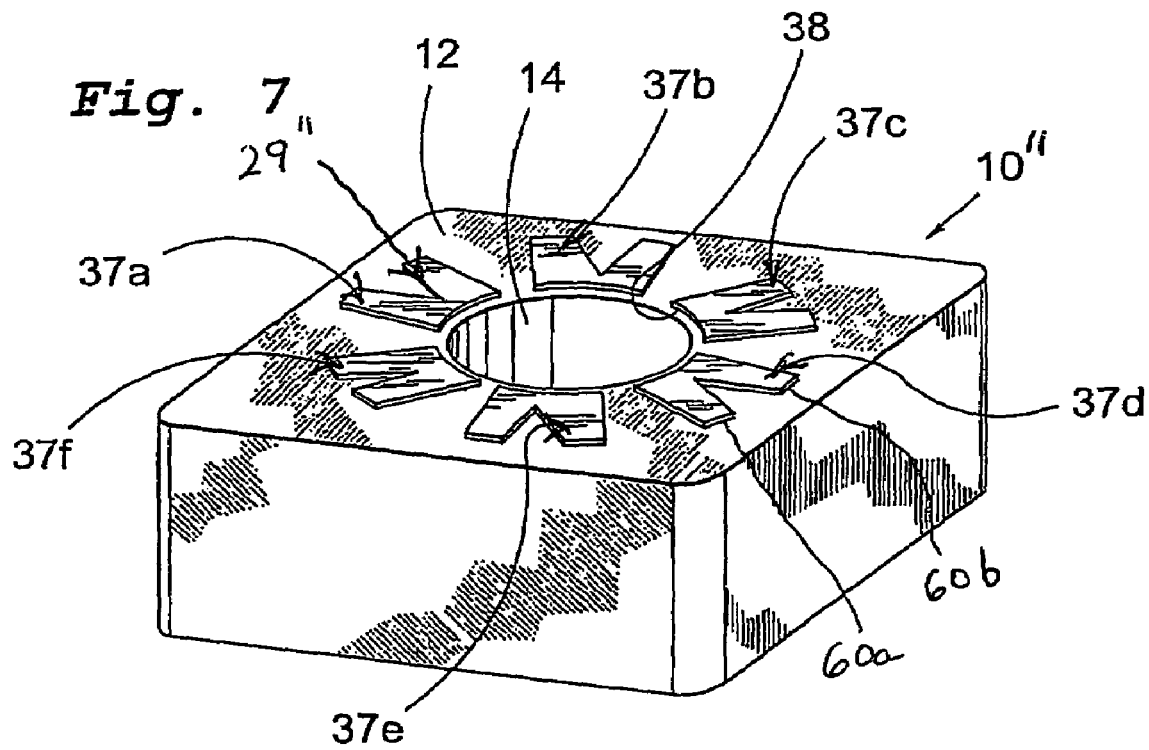
FIG. 7 shows a top perspective view of an additional insert shape according to the invention.

In FIG. 7, another insert embodiment 10" is shown, with the radiating projection array 29" radiating around the insert hole 14 being in the form of six projections 37a–37f spaced-apart from each other in circumferential directions, the distal end of each projection being in the form of two blunt tips 60a, 60b. The inner limiting edge of each projection is, as in the case of FIG. 6, concavely circularly curved with a radius of curvature substantially equal to the radius of curvature of the central hole 14. Each such surface segment is, furthermore, terminated a small distance from the hole 14.

In accordance with the present invention, there is provided a cutting insert whose top surface can be engaged by a clamp to be effectively clamped in two directions, and which leaves sufficient area on the top surface in order to, e.g., enable desired corner marking or other geometric marking or which enable insertion of more advanced chip breaker geometries directly pressed into the upper chip surface.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A cutting insert comprising a body forming top and bottom surfaces, and a center hole intersecting at least the top surface; a portion of the top surface which extends around the center hole including an array of projections radiating laterally outwardly around the center hole; wherein a distal end of each projection disposed farthest from the center hole defines a tip of the projection; the projections forming at least six tips spaced circumferentially apart; each tip having a planar top face, the planar top faces adapted to make planar contact with a pair of spaced contact surfaces disposed on a bottom of a holder clamp.

2. The cutting insert according to claim 1 wherein the top and bottom surfaces are generally parallel.

3. The cutting insert according to claim 1 wherein the array of projections is recessed.

4. The cutting insert according to claim 1 wherein the array of projections is raised.

5. The cutting insert according to claim 1 wherein the body defines at least one pair of cutting corners arranged opposite one another and having a common bisector; two of the projections being arranged adjacent respective ones of the cutting corners and each of those two projections having a distal end comprised of two tips; the two tips of each of those distal ends being arranged symmetrically on opposite sides of the bisector.

6. The cutting insert according to claim 5 wherein the bisector intersects a center of the center hole.

7. The cutting insert according to claim 5 wherein the cutting corners possess and angle less than 80°.

8. The cutting insert according to claim 1 wherein the projections define a laterally innermost edge arranged concentrically relative to the center hole.

9. The cutting insert according to claim 8 wherein a radius of curvature of the innermost edge is equal to a radius of curvature of the center hole.

10. The cutting insert according to claim 8 wherein a radius of curvature of the innermost edge is larger than a radius of curvature of the center hole.

11. The cutting insert according to claim 1 wherein the tips are sharply pointed.

12. The cutting insert according to claim 1 wherein the tips are convexly curved.

13. The cutting insert according to claim 1 wherein the tips are blunt.

14. A cutting tool comprising a holder, a cutting insert, a clamp for clamping the insert to the holder, and a screw for attaching the clamp to the holder, wherein:

the holder includes a seat having a bottom seat surface and a supporting surface structure upstanding form the bottom seat surface;

the insert includes a body forming top and bottom surfaces and a center hole intersecting at least the top surface, a portion of the top surface which extends around the center hole including an array of projections radiating laterally outwardly around the center hole, wherein a distal end of each projection disposed farthest from the center hole defines a tip of the projection, the projections forming at least six tips spaced circumferentially apart, each tip having a planar top face;

the clamp including an arm having front and rear portions, the rear portion being mounted to the holder by the screw, the arm further including:

a downwardly projecting nose at the front portion thereof, the nose extending into the center hole, and a bottom surface having a pair of spaced contact surfaces located generally behind the nose and arranged to make planar contact with the planar faces of the tips of respective ones of the projections; wherein the nose is arranged to press the insert rearwardly against the supporting surface structure, and the contact surfaces are arranged to press the insert downwardly against the bottom seat surface, in response to tightening of the screw.

15. The cutting tool according to claim 14 wherein the array of projections is recessed.

16. The cutting tool according to claim 14 wherein the array of projections is raised.

17. The cutting tool according to claim 14 wherein the body defines at least one pair of cutting corners arranged opposite one another and having a common bisector; two of the projections being arranged adjacent respective ones of the cutting corners and each of those two projections having a distal end comprised of two tips; the two tips of each of those distal ends being arranged symmetrically on opposite sides of the bisector.

18. The cutting tool according to claim 14 wherein the cutting corners possess an angle less than 80°.

19. The cutting tool according to claim 14 wherein the projections define a laterally innermost edge arranged concentrically relative to the center hole.

20. The cutting tool according to claim 14 wherein the tips are sharply pointed.

21. The cutting tool according to claim 14 wherein the tips are convexly curved.

22. The cutting tool according to claim 14 wherein the tips are blunt.

* * * * *